June 5, 1928.
E. J. HALL ET AL
1,672,121
BODY SUPPORT AND CROSS TIE
Filed March 30, 1927   2 Sheets-Sheet 2
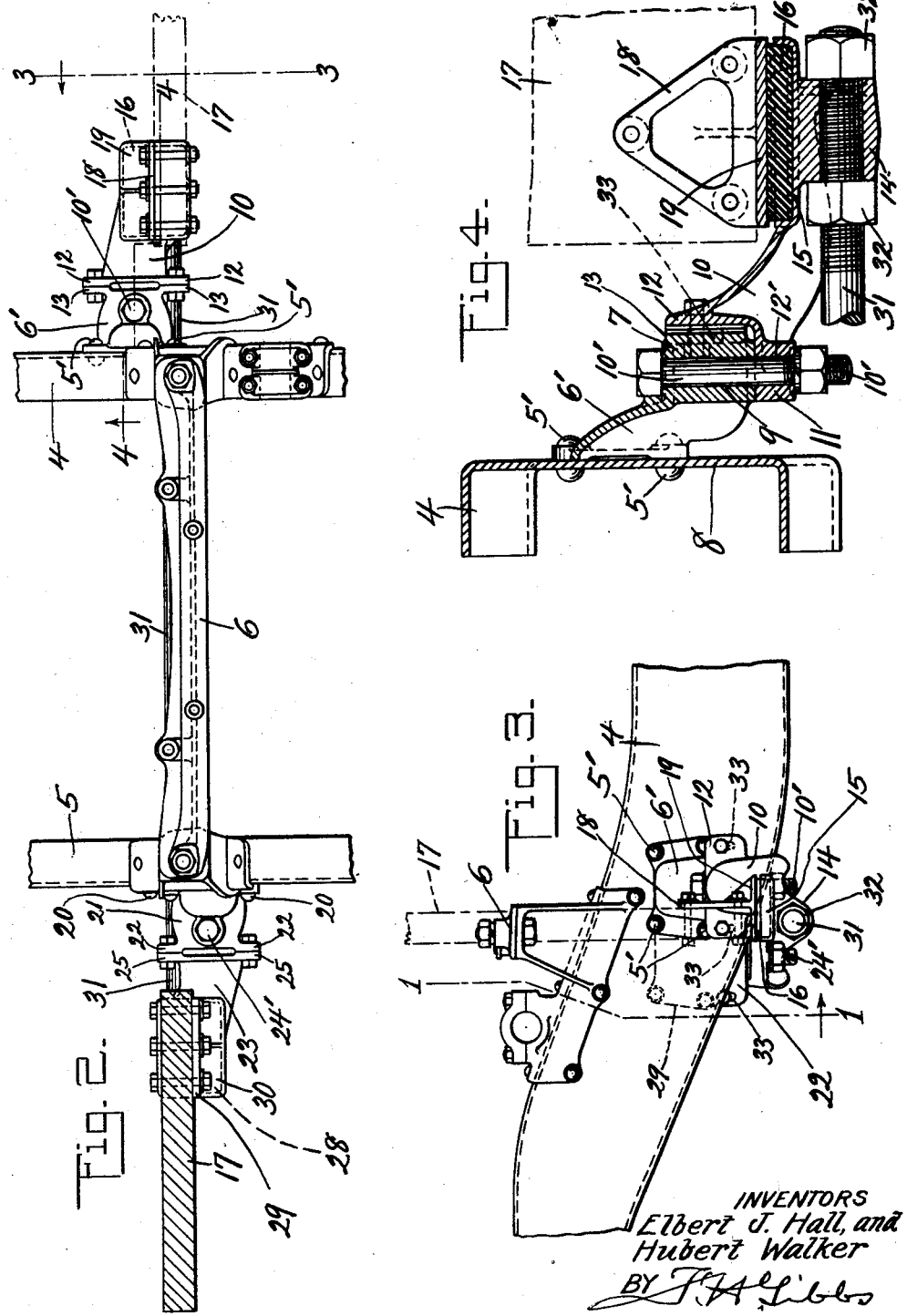
INVENTORS
Elbert J. Hall, and
Hubert Walker
BY
ATTORNEY Patented June 5, 1928.

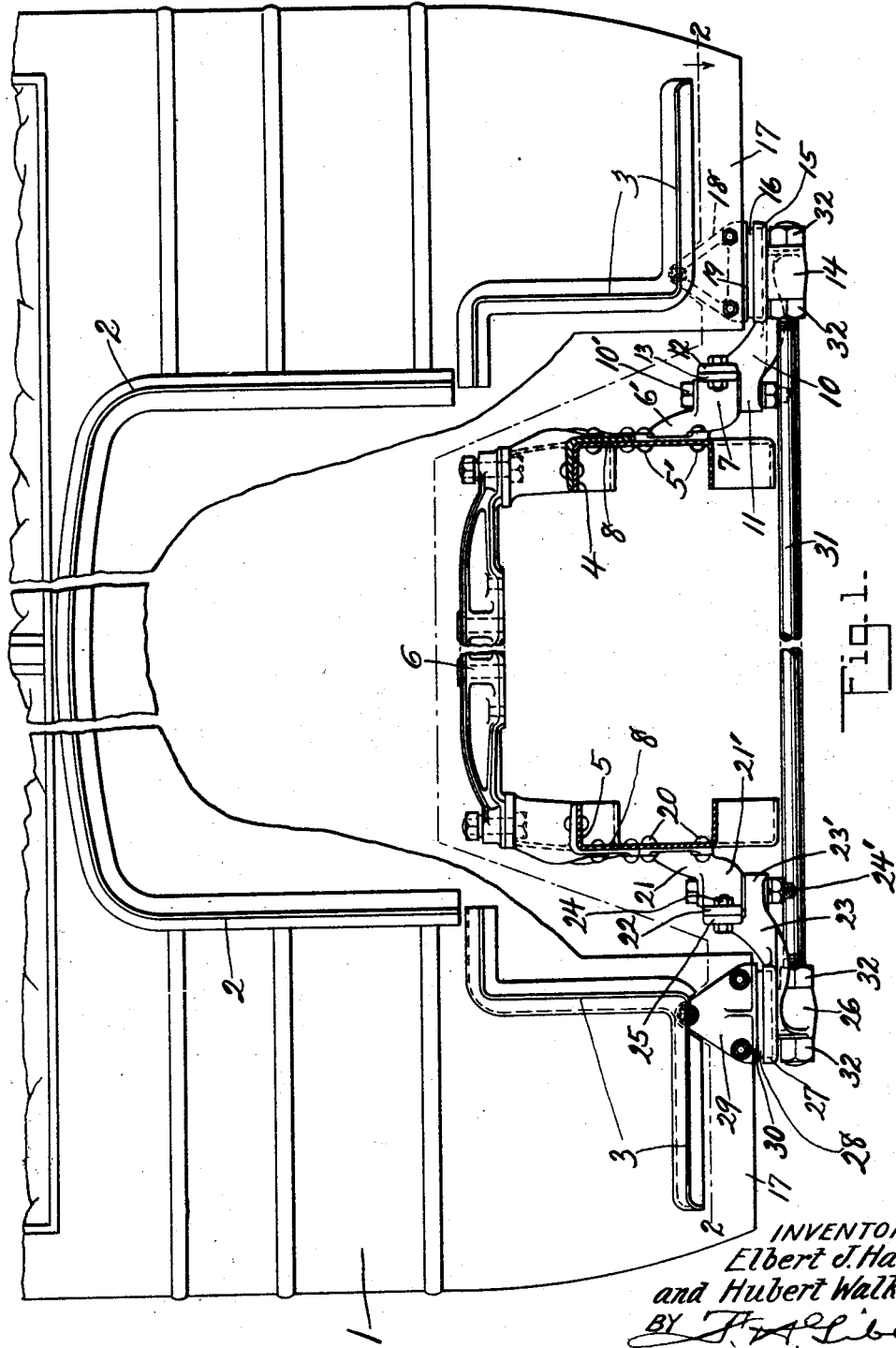

1,672,121

UNITED STATES PATENT OFFICE.

ELBERT J. HALL, OF DETROIT, AND HUBERT WALKER, OF ROYAL OAK, MICHIGAN, ASSIGNORS TO AMERICAN CAR AND FOUNDRY MOTORS COMPANY, OF NEW YORK, N. Y., A CORPORATION OF DELAWARE.

BODY SUPPORT AND CROSS TIE.

Application filed March 30, 1927. Serial No. 179,578.

The accompanying drawings illustrate the preferred form of the invention, though it is to be understood that the invention is not limited to the exact details of construction shown and described, as it is obvious that various modifications thereof within the scope of the claims will occur to persons skilled in the art. In said drawings:

Figure 1 is a front elevation of a motor vehicle, with certain parts broken away showing the invention applied thereto;

Fig. 2 is a top plan view on the line 2—2, Fig. 1;

Fig. 3 is a side elevation on the line 3—3, Fig. 2;

Fig. 4 is a sectional view on the line 4—4, Fig. 2.

This invention relates to motor vehicles, and particularly comprehends a combined body-support and frame cross-tie for such vehicles.

At the present time, motor buses provide a large part of the transportation system, and due to the size of such buses, it is highly desirable that the center of gravity thereof be as low as possible. In view of this, it is necessary that the floor of the bus be arranged as low as possible, and to this end, the chassis frame side members are usually bent outwardly, or in other words, provided with an offset portion commencing approximately at a point adjacent the rear end of the engine and extending forwardly the remaining length of the frame members. Cross bars are provided between the chassis frame side members, the combined cross bars and chassis frame side members forming the usual chassis frame. One of these cross bars is generally positioned ahead of the engine and the other is usually positioned in the rear of the transmission or generator as the case may be. The construction just described is usual at the present time, and it has been found that due to the distance between the two cross members and also because of the offset portion of the side frames, the chassis frame has a tendency to be unstable; the side members twisting or weaving in and out commensurate with the load.

With the disadvantages just mentioned in mind, it is the primary object of this invention to provide means for supporting the front end of the vehicle body, more particularly at the dash thereof, and at the same time, to provide a means for tying or otherwise connecting the vehicle chassis frame members together.

Another object of this invention is to provide a means for supporting the bus body at the dash thereof, as well as to provide readily adjustable means whereby the chassis frame side members are maintained in their proper spaced relation and in proper alinement.

Other objects and advantages of this invention will be apparent from the following description taken in conjunction with the accompanying drawings in which, referring now more particularly to Figure 1, a motor bus is illustrated having a body 1, a hood support 2, and the fender supports 3. No engine is shown in Figure 1, it having been omitted in order to fully disclose the invention, but this figure discloses the chassis frame side members 4 and 5 of the usual chassis frame, and the rear engine support 6 connected to the chassis frame, all of which is old and no claim is made therefor.

The present invention comprises mainly a tie rod supporting bracket, and a second bracket carried thereby for supporting the vehicle dash, and referring now to Figure 4, the side frame 4 has secured thereto by means of rivets 5', a depending bracket 6' which terminates in a tubular supporting portion 7 which is arranged substantially parallel with the web 8 of the side frame 4. This portion 7 being tubular is provided with an opening 9 extending therethrough, and said portion 7 supports and carries a second bracket 10, having a lower bearing portion 11 and an upright supporting flange 12; the bearing portion 11 having an opening 12' extending therethrough which is alined with the opening 9 in the portion 7 when the bracket 10 is in position. A bolt 10' is positioned in the alined openings 9 and 12 for connecting the portions 7 and 11. As clearly shown in Figure 2, the bracket 10 is connected to the bracket 6' by means of bolts extending through the flange 12 and a flange 13 formed on the bracket 6', see Figure 2. This bracket 10 extends outwardly and depends from the bracket 6' and at its end carries an ear 14, and the end of said bracket is provided with an upwardly arranged pocket or recess 15 in which is positioned a block 16 of rubber or other suitable resilient material. The numeral 17 indicates a portion of the dash 1 of the bus, and to this portion 17 is secured a bracket 18 having a base 19 which bears on the upper surface of the block 16.

Secured to the side frame 5 by means of the rivets 20 is a bracket 21 (Fig. 1) having a supporting flange 22 which carries and supports a second bracket 23 by means of the bolts 24 extending through said flange 22 and a flange 25 formed on the bracket 23. The bracket 23 depends from the bracket 21 and is joined with a base 23′ which is positioned under the portion 21′ of bracket 21. The portion 21′ and base 23′ have alined openings which receive a connecting bolt 24′ for an obvious purpose. The end of bracket 23 is provided with a depending ear 26 and an upwardly arranged recess or pocket 27 in which latter is seated a block 28 of rubber or other resilient material. The bus body carries a bracket 29 having a bearing plate 30 which rests on the rubber block 28.

Figure 2 shows the brackets on the side frames 4 and 5 as out of alignment, and this is due to the fact that the brackets are identical in construction, and being identical in construction it is necessary to offset one bracket with respect to the other to position the ears 14 and 26 in alignment. However, this is not to be construed as a limitation, for obviously the brackets may be so constructed that they may be placed directly opposite each other on the respective frame members 4 and 5 with the ears 14 and 26 of the brackets in actual alignment.

A tie-rod 31 is provided, the ends of which are received within the ears 14 and 26, and by means of suitable elements such as nuts 32, the tie-rod may be adjusted with respect to the ears and the brackets whereby to pull or push the frame at this point to the proper width in spite of any distortion there may be present.

The brackets 10 and 23 may be vertically adjusted relative to the brackets 6′ and 21 in order to properly position the vehicle body at the dash, and to this end the flanges 13 and 22 of the two brackets are each provided with a slot indicated at 33 in Figure 3, whereby the required variation in position of the brackets 10 and 23 may be obtained.

With the construction just described, it is obvious that the body of the vehicle, adjacent the dash thereof, is supported through the bracket constructions and the resilient material in the recesses formed in the brackets 10 and 23, and further, it will be obvious that due to tie-rod 31, the side frames 4 and 5 may be maintained in their spaced relation and in alignment, and further that because of the specific mounting of the brackets 10 and 23 with respect to the brackets 6′ and 21 respectively, said brackets 10 or 23 may be adjusted vertically with respect to their supporting brackets and thus assist in securing a proper alignment of the frame members 4 and 5 as well as a proper positioning of the vehicle body at the dash thereof.

What is claimed is:

1. In a vehicle, means attached to the side members of the chassis frame and depending therefrom for supporting the body, and means carried by said supporting means and extending beneath the side members for adjusting the side members and for retaining them in proper spaced relation.

2. In a vehicle, a chassis frame having side members, brackets secured to and depending from said side members, and adjustable means carried by said brackets and extending beneath the side members to adjust said side members.

3. In a vehicle, a chassis frame having side members, and adjustable means carried by and connecting said side members at a point adjacent the dash of the vehicle for supporting the vehicle body and for adjusting the side members inwardly and outwardly relative to each other and in desired spaced relation.

4. Means for supporting a vehicle body and for maintaining chassis frame side members in alinement, comprising brackets depending from said side frame members, and connected to said vehicle body, and an adjustable tie rod connecting said brackets below the side members.

5. Means for supporting a vehicle body and for maintaining chassis frame side members in alinement, comprising a bracket adjustably secured to each side member, a tie rod supporting element carried by each of said brackets and having vehicle body supporting means, and an adjustable tie rod carried by said supporting means beneath the side members.

6. In a vehicle having chassis frame side members, means for placing said members in desired spaced relation and for retaining them in such relation comprising a tie rod extending beneath said side members, and adjustable brackets secured to the side members for supporting the tie rod.

7. In a vehicle having chassis frame side members, means for placing said members in desired spaced relation and for retaining them in such relation comprising a tie rod beneath the side members, and adjustable brackets secured to and depending from the side members for supporting the tie rod.

8. In a vehicle having chassis frame side members, adjustable supporting brackets secured to said side members, a tie rod connecting said brackets and so formed as to adjust the relative positions of said side members, and to retain the latter in adjusted position, and supporting elements formed with said brackets upon which the vehicle body bears for supporting said body.

9. In a vehicle having chassis frame side members, adjustable supporting brackets secured to said side members and depending therefrom, a tie rod extending transversely beneath the side members and connecting said brackets, said tie rod being connected to said brackets in such a manner that the tie rod may be adjusted to vary the relative positions of the side members and to retain the latter in adjusted position, and supporting elements formed with said brackets upon which the vehicle body bears for supporting said body.

10. In a vehicle having chassis frame side members, means for relatively adjusting said members and for retaining them in adjusted position comprising oppositely disposed brackets each including an attaching section secured to the side members, a supporting section adjustably secured to the attaching section, and a tie rod connecting said supporting sections.

11. In a vehicle having chassis frame side members, means for relatively adjusting said members and for retaining them in adjusted position comprising oppositely disposed brackets each including an attaching section secured to the side members, a supporting section adjustably secured to the attaching section, and a tie rod connecting said supporting sections and arranged below and extending transversely across the side members.

12. In a vehicle having chassis frame side members, means for connecting said members and for retaining said members in connected relation comprising a tie rod extending transversely beneath the side members, adjustable means secured to and depending from the side members for supporting the tie rod, and a supporting element formed with said adjustable means for supporting the vehicle.

13. In a vehicle having chassis frame side members, means for connecting said members and for retaining said members in connected relation comprising a tie rod extending transversely beneath the side members, adjustable means secured to and depending from the side members for supporting the tie rod, a supporting element formed with said adjustable means, and a resilient pad in such supporting element upon which the vehicle body rests to support the same.

14. In a vehicle having chassis frame side members, means for supporting the vehicle body and for connecting the side members whereby the latter may be placed in desired relative relation and retained therein, comprising oppositely disposed adjustable bracket members secured to the side members, a vehicle supporting element formed with each of said members, and a tie rod adjustably connecting said bracket members.

In witness whereof we have hereunto set our hands.

ELBERT J. HALL.
HUBERT WALKER.